(12) United States Patent
Kadono

(10) Patent No.: US 12,331,485 B2
(45) Date of Patent: Jun. 17, 2025

(54) SYSTEM AND METHOD FOR CONTROLLING A PLURALITY OF WORK MACHINES

(71) Applicant: KOMATSU LTD., Tokyo (JP)

(72) Inventor: Yuuichi Kadono, Tokyo (JP)

(73) Assignee: KOMATSU LTD., Tokyo (JP)

( * ) Notice: Subject to any disclaimer, the term of this patent is extended or adjusted under 35 U.S.C. 154(b) by 229 days.

(21) Appl. No.: 18/043,771

(22) PCT Filed: Oct. 13, 2021

(86) PCT No.: PCT/JP2021/037828
§ 371 (c)(1),
(2) Date: Mar. 2, 2023

(87) PCT Pub. No.: WO2022/130756
PCT Pub. Date: Jun. 23, 2022

(65) Prior Publication Data
US 2024/0026646 A1    Jan. 25, 2024

(30) Foreign Application Priority Data
Dec. 18, 2020 (JP) .................................. 2020-210749

(51) Int. Cl.
*E02F 9/00*          (2006.01)
*E02F 3/84*          (2006.01)
(Continued)

(52) U.S. Cl.
CPC ............ *E02F 9/2054* (2013.01); *E02F 3/841* (2013.01); *E02F 9/205* (2013.01); *E02F 9/261* (2013.01)

(58) Field of Classification Search
CPC ......... E02F 9/2054; E02F 3/841; E02F 9/205; E02F 9/261
(Continued)

(56) References Cited

U.S. PATENT DOCUMENTS 9,256,227 B1 * 2/2016 Wei ........................... E02F 9/24
10,860,016 B1 * 12/2020 Wang ................... G05D 1/0219
(Continued)

FOREIGN PATENT DOCUMENTS

CA     3 119 718 A1    10/2020
CN     109542105 A     3/2019
(Continued)

OTHER PUBLICATIONS

The International Search Report for the corresponding international application No. PCT/JP2021/037828, issued on Nov. 22, 2021.
(Continued)

*Primary Examiner* — Tiffany P Young
*Assistant Examiner* — Michael T Dowling
(74) *Attorney, Agent, or Firm* — Global IP Counselors, LLP

(57) ABSTRACT

A system controls a plurality of work machines including a first work machine and a second work machine. The system includes a communication device configured to wirelessly communicate with the plurality of work machines, and a controller. The controller acquires area data indicative of a position of a work area. The controller determines a first work path to be dug by the first work machine, the first work path extending in a predetermined work direction in the work area. The controller determines a second work path to be dug by the second work machine, the second work path extending in the work direction in the work area and disposed at an interval from the first work path in a lateral direction intersecting the work direction. The controller determines a next first work path and a next second work path so that the interval is decreased.

10 Claims, 8 Drawing Sheets

(51) Int. Cl.
*E02F 9/20* (2006.01)
*E02F 9/26* (2006.01)

(58) Field of Classification Search
USPC .............................................................. 701/2
See application file for complete search history.

(56) References Cited

U.S. PATENT DOCUMENTS

| | | | |
|---|---|---|---|
| 11,054,831 B2 * | 7/2021 | O'Donnell | E02F 9/262 |
| 11,126,188 B2 * | 9/2021 | Spielman | G05D 1/0238 |
| 2016/0076893 A1 * | 3/2016 | Wei | E02F 9/2045 |
| | | | 701/410 |
| 2016/0170411 A1 | 6/2016 | Wei et al. | |
| 2016/0289922 A1 | 10/2016 | Wei et al. | |
| 2017/0135277 A1 | 5/2017 | Hiramatsu et al. | |
| 2017/0168501 A1 | 6/2017 | Ogura et al. | |
| 2017/0177002 A1 | 6/2017 | Ogura et al. | |
| 2017/0311534 A1 | 11/2017 | Rusciolelli et al. | |
| 2018/0319392 A1 | 11/2018 | Posselius et al. | |
| 2019/0106862 A1 | 4/2019 | Ono et al. | |
| 2022/0002966 A1 | 1/2022 | Takaoka | |
| 2022/0049473 A1 | 2/2022 | Takaoka | |
| 2022/0106768 A1 | 4/2022 | Takaoka | |

FOREIGN PATENT DOCUMENTS

| | | | |
|---|---|---|---|
| CN | 110806753 A | | 2/2020 |
| CN | 112956959 A | * | 6/2021 |
| JP | 2011-254704 A | | 12/2011 |
| JP | 2014-230667 A | | 12/2014 |
| JP | 2020-84460 A | | 6/2020 |
| JP | 2020-166302 A | | 10/2020 |
| JP | 2020-180451 A | | 11/2020 |
| WO | 2015/147149 A1 | | 10/2015 |
| WO | 2018/051742 A1 | | 3/2018 |

OTHER PUBLICATIONS

The Office Action for the corresponding Canadian application No. 3,194,366 issued on Aug. 14, 2024.
The Office Action for the corresponding Chinese application No. 202180061865.7, issued on Aug. 8, 2024.
The Office Action for the corresponding Chinese application No. 202180061865.7, issued on Jan. 25, 2025.

* cited by examiner

SYSTEM AND METHOD FOR CONTROLLING A PLURALITY OF WORK MACHINES

CROSS-REFERENCE TO RELATED APPLICATIONS

This application is a U.S. National stage application of International Application No. PCT/JP2021/037828, filed on Oct. 13, 2021. This U.S. National stage application claims priority under 35 U.S.C. § 119(a) to Japanese Patent Application No. 2020-210749, filed in Japan on Dec. 18, 2020, the entire contents of which are hereby incorporated herein by reference.

BACKGROUND

Technical Field

The present invention relates to a system and a method for controlling a plurality of work machines.

Background Information

Conventionally, a technique for automatically controlling a work machine is known. For example, in Japanese Unexamined Patent Publication 2020-166302, a controller allocates one work area to one work machine. The controller determines a plurality of work paths to be dug by the work machine in the work area. The plurality of work paths extend in a predetermined work direction and are aligned in a lateral direction. The work machine performs digging in the allocated work area while traveling back and forth on the plurality of work paths.

SUMMARY

In the above technique, only one work machine performs digging in one work area. However, in order to provide efficient digging in one work area, it is considered that a plurality of work machines perform digging. In this case, it is preferable to set an appropriate work path for each of the work machines to achieve more efficient digging. An object of the present disclosure is to achieve efficient digging by the plurality of work machines.

A system according to an aspect of the present disclosure is a system for controlling a plurality of work machines. The plurality of work machines include a first work machine and a second work machine. The system according to the present aspect includes a communication device and a controller. The communication device wirelessly communicates with the plurality of work machines. The controller is programmed to execute the following processes. The controller acquires area data indicative of a position of a work area. The controller determines a first work path to be dug by the first work machine. The first work path extends in a work direction in the work area. The controller determines a second work path to be dug by the second work machine. The second work path extends in the work direction in the work area. The second work path is disposed at an interval from the first work path in a lateral direction intersecting the work direction. The controller determines a next first work path and a next second work path so that the interval is decreased.

A method according to another aspect of the present disclosure is a method for controlling a plurality of work machines. The plurality of work machines include a first work machine and a second work machine. The method according to the present aspect includes acquiring area data indicative of a position of a work area, determining a first work path to be dug by the first work machine, and determining a second work path to be dug by the second work machine. The first work path extends in a work direction in the work area. The second work path extends in the work direction in the work area. The second work path is disposed at an interval from the first work path in a lateral direction intersecting the work direction. The method according to the present aspect further includes determining a next first work path and a next second work path so that the interval is decreased.

According to the present disclosure, the first work path to be dug by the first work machine is determined, and the second work path to be dug by the second work machine is determined at an interval from the first work path. Then, a next first work path and a next second work path are determined so that the interval is decreased. Therefore, the digging of the first work path by the first work machine and the digging of the second work path by the second work machine are repeated, thereby gradually decreasing a range that has not been dug and is positioned between the first work machine and the second work machine in the work area. This reduces the moving distance of the first work machine and the second work machine for digging the work area. As a result, efficient digging by a plurality of work machines is achieved.

DETAILED DESCRIPTION OF EMBODIMENT(S)

Figure 1:
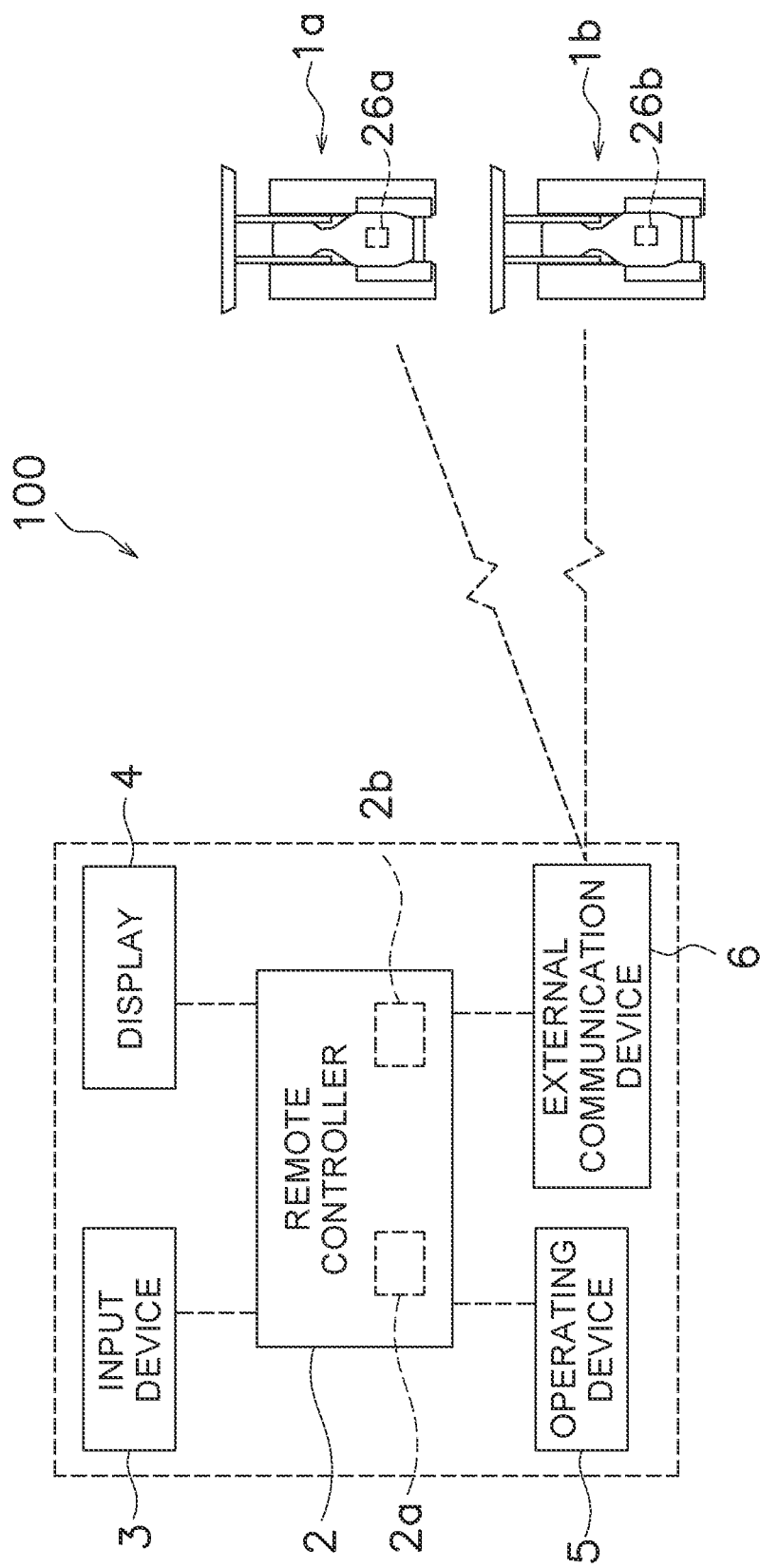
FIG. 1 is a schematic diagram illustrating a control system of a work machine according to an embodiment.

A control system of a work machine according to an embodiment will be described below with reference to the drawings. FIG. 1 is a schematic diagram illustrating a control system 100 of a work machine according to an embodiment. As illustrated in FIG. 1, the control system 100 includes a plurality of work machines 1a and 1b, a remote controller 2, an input device 3, a display 4, an operating device 5, and an external communication device 6. The control system 100 controls the work machines 1a and 1b disposed at a work site such as a mine or the like. The plurality of work machines 1a and 1b include a first work machine 1a and a second work machine 1b. The work machines 1a and 1b according to the present embodiment are bulldozers.

The remote controller 2, the input device 3, the display 4, the operating device 5, and the external communication device 6 are disposed outside of the work machines 1a and 1b. The remote controller 2, the input device 3, the display 4, the operating device 5, and the external communication device 6 may be disposed, for example, in a management center outside of the work machines 1a and 1b. The remote controller 2 remotely controls the work machines 1a and 1b. The number of the work machines remotely controlled by the remote controller 2 is not limited to two and may be greater than two.

Figure 2:
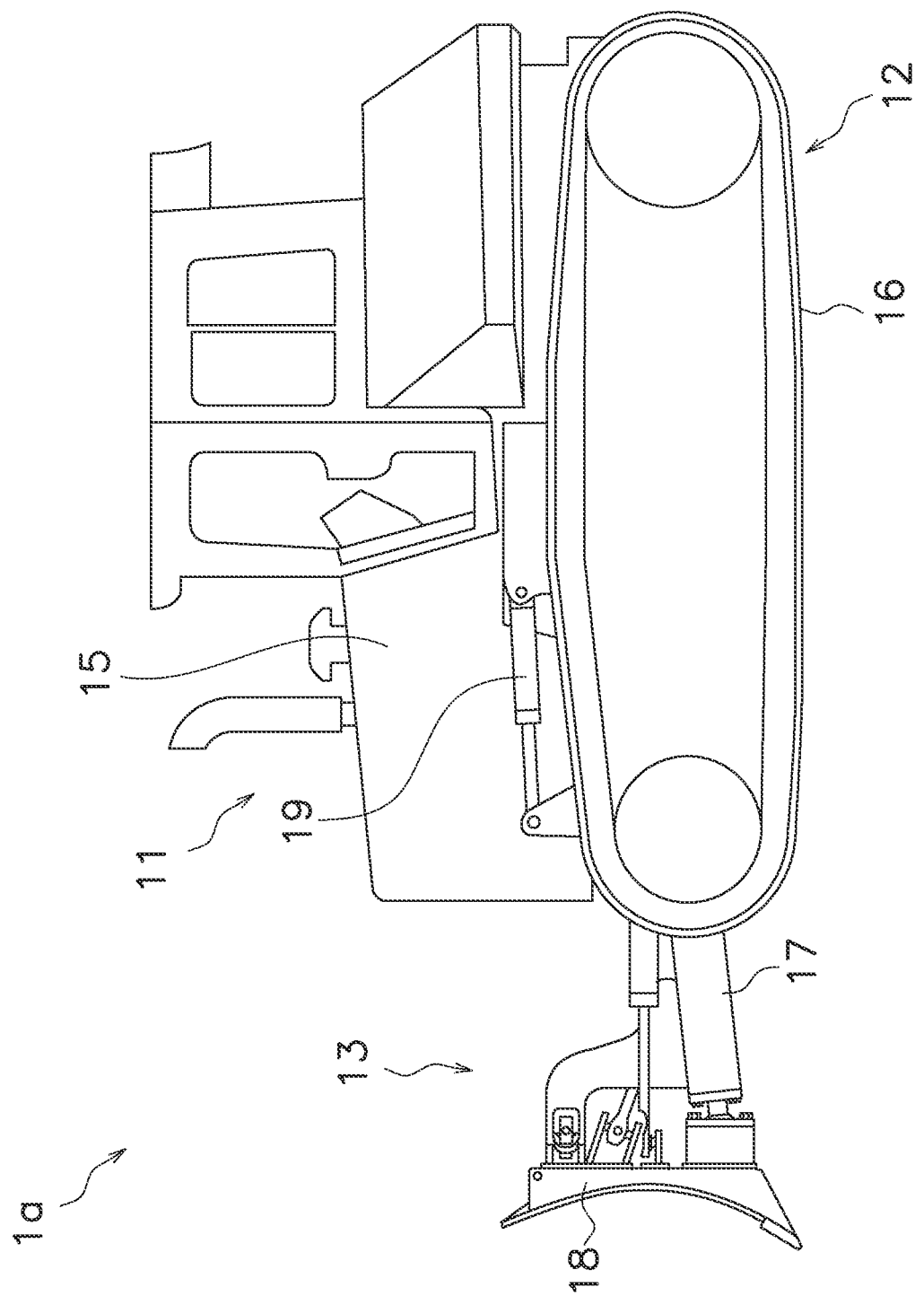
FIG. 2 is a side view of the work machine.
Figure 3:
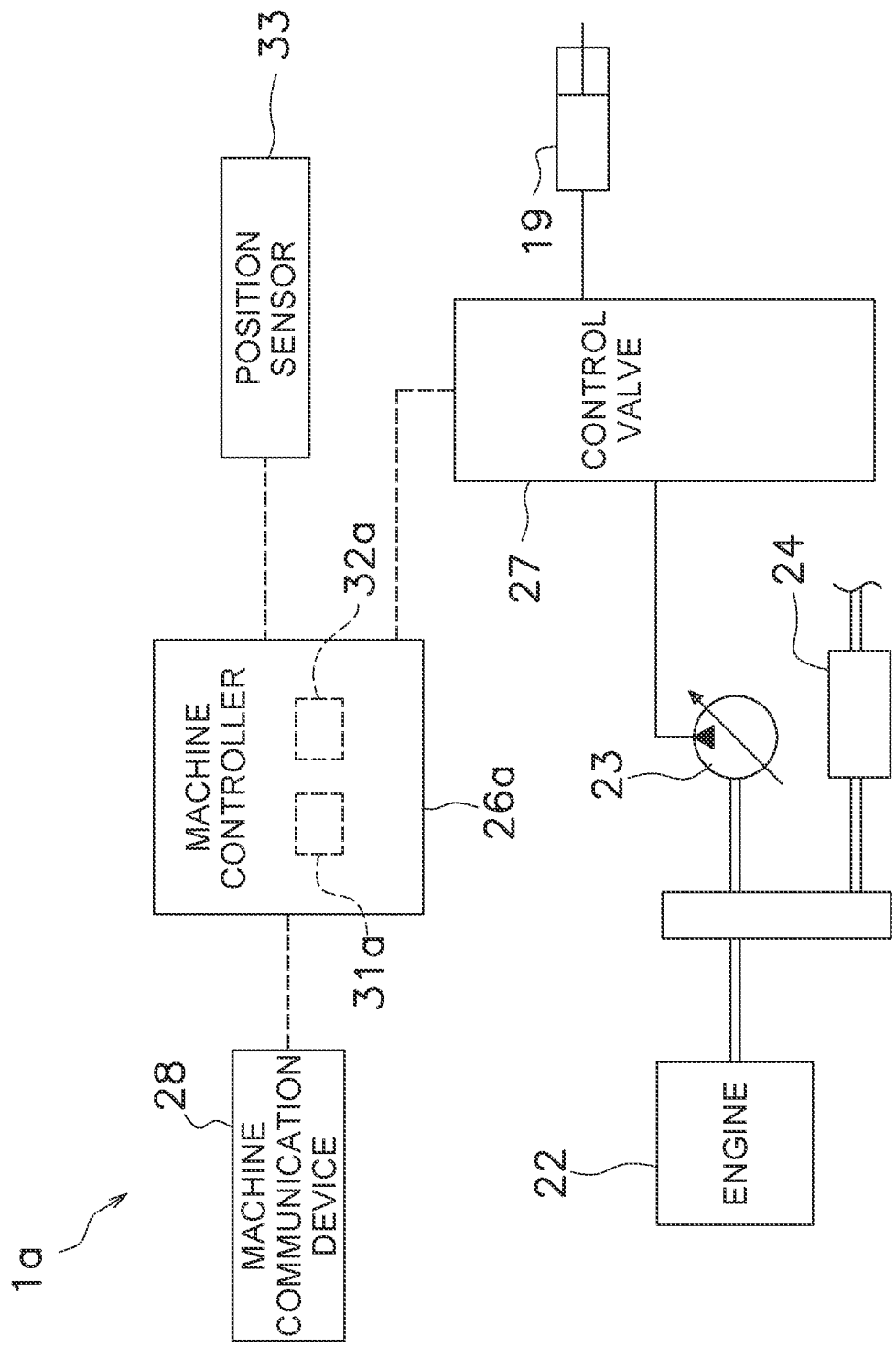
FIG. 3 is a schematic diagram illustrating a configuration of the work machine.

FIG. 2 is a side view of the first work machine 1a. FIG. 3 is a block diagram illustrating a configuration of the first work machine 1a. The first work machine 1a will be described below, but the configuration of the second work machine 1b is the same as that of the first work machine 1a. As illustrated in FIG. 2, the first work machine 1a includes a vehicle body 11, a travel device 12, and a work implement 13. The vehicle body 11 includes an engine compartment 15. The travel device 12 is attached to the vehicle body 11. The travel device 12 includes a pair of left and right crawler belts 16. Only the left crawler belt 16 is illustrated in FIG. 2. The work machine 1a travels due to the rotation of the crawler belts 16.

The work implement 13 is attached to the vehicle body 11. The work implement 13 includes a lift frame 17, a blade 18, and a lift cylinder 19. The lift frame 17 is attached to the vehicle body 11 so as to be movable up and down. The lift frame 17 supports the blade 18. The blade 18 moves up and down accompanying the movements of the lift frame 17. The lift frame 17 may be attached to the travel device 12. The lift cylinder 19 is coupled to the vehicle body 11 and the lift frame 17. Due to the extension and contraction of the lift cylinder 19, the lift frame 17 moves up and down.

As illustrated in FIG. 3, the first work machine 1a includes an engine 22, a hydraulic pump 23, a power transmission device 24, and a control valve 27. The hydraulic pump 23 is driven by the engine 22 to discharge hydraulic fluid. The hydraulic fluid discharged from the hydraulic pump 23 is supplied to the lift cylinder 19. Although one hydraulic pump is illustrated in FIG. 3, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be a transmission having a torque converter or a plurality of transmission gears. Alternatively, the power transmission device 24 may be another type of transmission.

The control valve 27 is disposed between a hydraulic actuator such as the lift cylinder 19 and the hydraulic pump 23. The control valve 27 controls the flow rate of hydraulic fluid supplied from the hydraulic pump 23 to the lift cylinder 19. The control valve 27 may be a pressure proportional control valve. Alternatively, the control valve 27 may be an electromagnetic proportional control valve.

The first work machine 1a includes a machine controller 26a and a machine communication device 28. The machine controller 26a controls the travel device 12 or the power transmission device 24, thereby causing the first work machine 1a to travel. The machine controller 26a controls the control valve 27, thereby causing the blade 18 to move up and down.

The machine controller 26a is programmed to control the first work machine 1a based on acquired data. The machine controller 26a includes a processor 31a and a storage device 32a. The processor 31a is, for example, a central processing unit (CPU). Alternatively, the processor 31a may be a processor different from the CPU. The processor 31a executes processes for controlling the first work machine 1a according to programs.

The storage device 32a includes a non-volatile memory such as a ROM and a volatile memory such as a RAM. The storage device 32a may include an auxiliary storage device such as a hard disk, a solid state drive (SSD), or the like. The storage device 32a is an example of a non-transitory computer-readable recording medium. The storage device 32a stores computer commands and data for controlling the first work machine 1a.

The machine communication device 28 wirelessly communicates with the external communication device 6. For example, the machine communication device 28 communicates with the external communication device 6 by a wireless LAN such as Wi-Fi (registered trademark), a mobile communication such as 3G, 4G, or 5G, or another type of wireless communication system.

The first work machine 1a includes a position sensor 33. The position sensor 33 may include, for example, a global navigation satellite system (GNSS) receiver such as a global positioning system (GPS). Alternatively, the position sensor 33 may include a receiver for another positioning system. The position sensor 33 may include a ranging sensor such as a light detection and ranging (LIDAR) scanner, or an image sensor such as a stereo camera. The position sensor 33 outputs position data to the machine controller 26a. The position data indicates a position of the first work machine 1a.

As illustrated in FIG. 1, the second work machine 1b includes a machine controller 26b. The second work machine 1b has the same configuration as the first work machine 1a.

The external communication device 6 wirelessly communicates with the machine communication device 28. The external communication device 6 transmits a command signal from the remote controller 2 to the machine communication device 28. The machine controller 26a receives the command signal via the machine communication device 28. The external communication device 6 receives the position data of the first work machine 1a via the machine communication device 28. Similarly, the external communication device 6 receives the position data of the second work machine 1b.

The input device 3 is a device that is operable by an operator. The input device 3 receives an input command from the operator and outputs an operation signal corresponding to the input command to the remote controller 2. The input device 3 outputs the operation signal according to an operation by the operator. The input device 3 outputs the operation signal to the remote controller 2. The input device 3 may include a pointing device such as a mouse, a trackball, or the like. The input device 3 may include a keyboard.

The display 4 includes a monitor such as a CRT, an LCD, an OELD, or the like. The display 4 receives an image signal from the remote controller 2. The display 4 displays an image corresponding to the image signal. The display 4 may be integrated with the input device 3. For example, the input device 3 and the display 4 may include, for example, a touch screen.

The operating device 5 is operable by the operator. The operating device 5 includes, for example, a pedal, a lever, or a switch. The operating device 5 is able to remotely control the plurality of work machines 1a and 1b individually. The operating device 5 may specify a portion of the plurality of work machines 1a and 1b to remotely control the portion.

The work machines 1a and 1b can be switched between an automatic mode and a manual mode.

In the automatic mode, the work machines 1a and 1b operate automatically without operations by the operator. In the automatic mode, the work machines 1a and 1b operate according to a command from the remote controller 2 as described later. Alternatively, in the automatic mode, the work machines 1a and 1b operate autonomously and automatically. In this case, the work machines 1a and 1b operate according to determination of the machine controller of each of the work machine 1a and 1b.

In the manual mode, the work machines 1a and 1b operate according to an operation signal from the operating device 5. The operating device 5 receives an operation by the operator and outputs the operation signal according to the operation. The operation signal is transmitted to the plurality of work machines 1a and 1b via the external communication device 6.

The remote controller 2 remotely controls the work machines 1a and 1b. The remote controller 2 receives the operation signal from the input device 3. The remote controller 2 outputs the image signal to the display 4. The remote controller 2 includes a processor 2a and a storage device 2b. The processor 2a is, for example, a central processing unit (CPU). Alternatively, the processor 2a may be a processor different from the CPU. The processor 2a executes processes for controlling the work machines 1a and 1b according to programs. In the following description, the description regarding the processes executed by the remote controller 2 may be interpreted as the processes executed by the processor 2a.

The storage device 2b includes a non-volatile memory such as a ROM and a volatile memory such as a RAM. The storage device 2b may include an auxiliary storage device such as a hard disk, a solid state drive (SSD), or the like. The storage device 2b is an example of a non-transitory computer-readable recording medium. The storage device 2b stores computer commands and data for controlling the work machines 1a and 1b.

Figure 4:
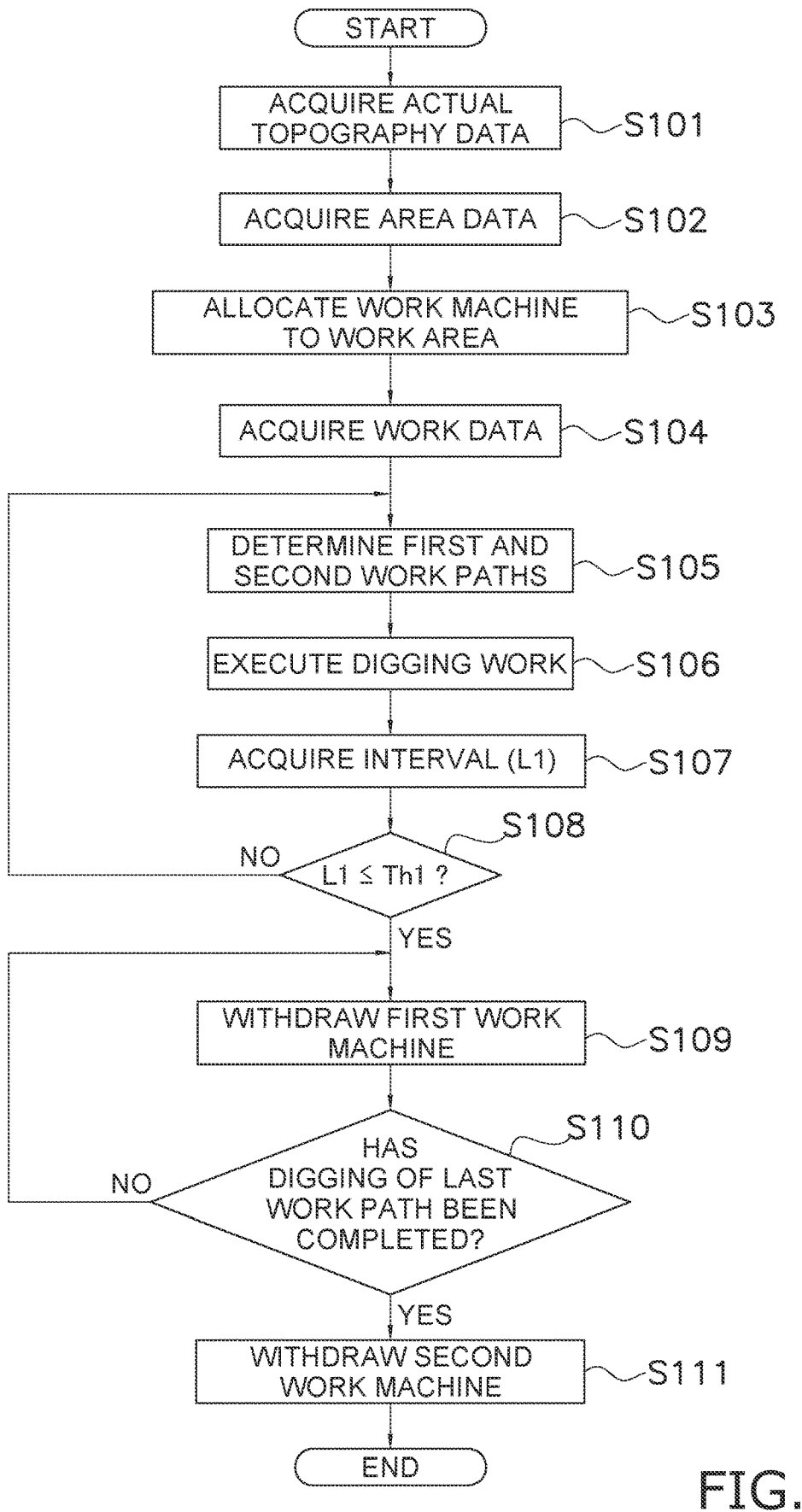
FIG. 4 is a flowchart illustrating processes of automatic control.

Next, automatic control of the work machines 1a and 1b executed by the control system 100 will be described. FIG. 4 is a flowchart illustrating processes executed by the remote controller 2.

Figure 5:
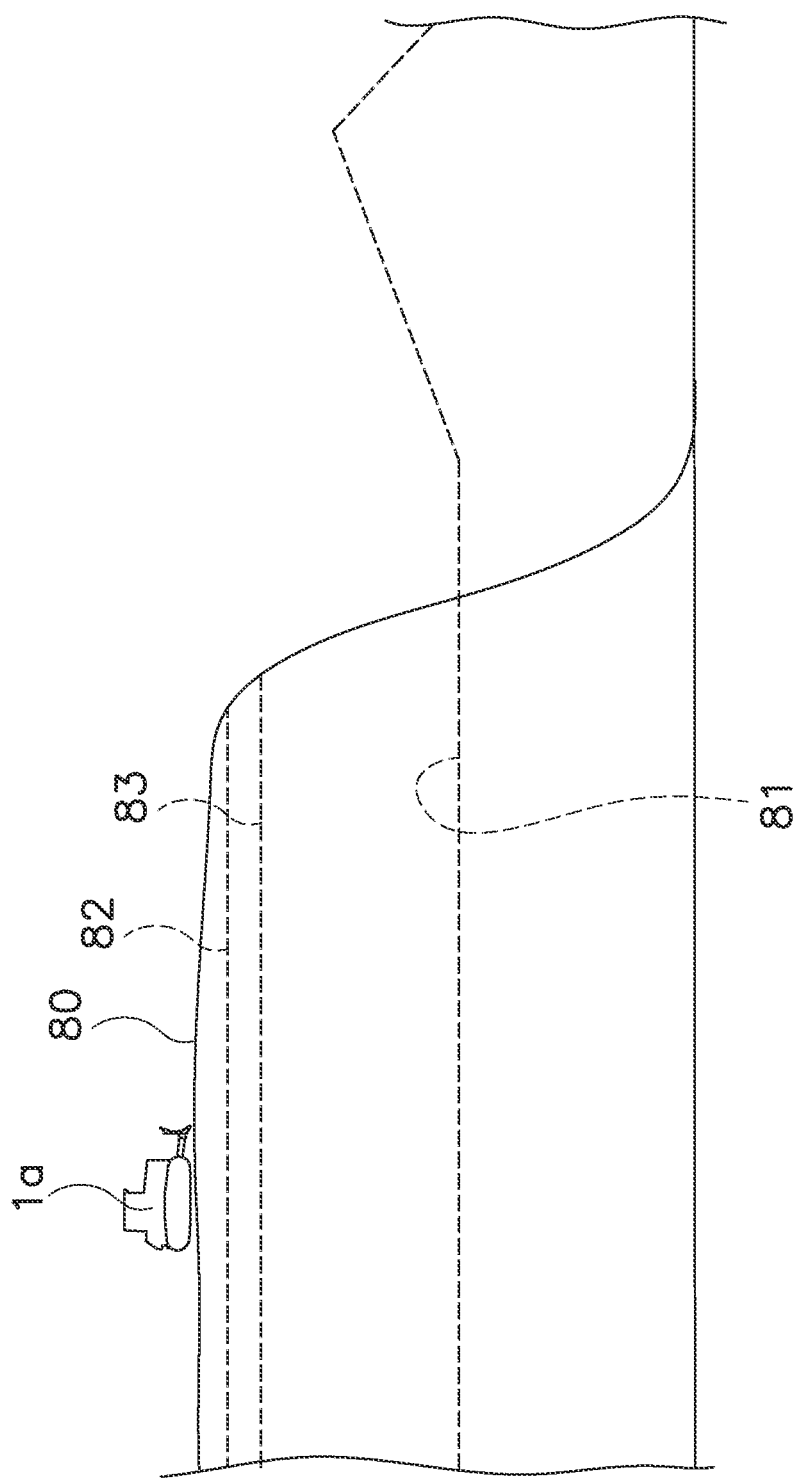
FIG. 5 is a side view illustrating an example of an actual topography.

As illustrated in FIG. 4, in step S101, the remote controller 2 acquires actual topography data. The actual topography data indicates an actual topography of a work site. FIG. 5 is a side view illustrating an example of an actual topography 80. The actual topography data includes coordinates and heights of a plurality of points on the actual topography 80. The remote controller 2 acquires the actual topography data from an external computer, a survey device, or a recording medium. The work machines 1a and 1b dig the actual topography 80 under automatic control so that the actual topography 80 has a shape along a final target topography 81.

Figure 6:
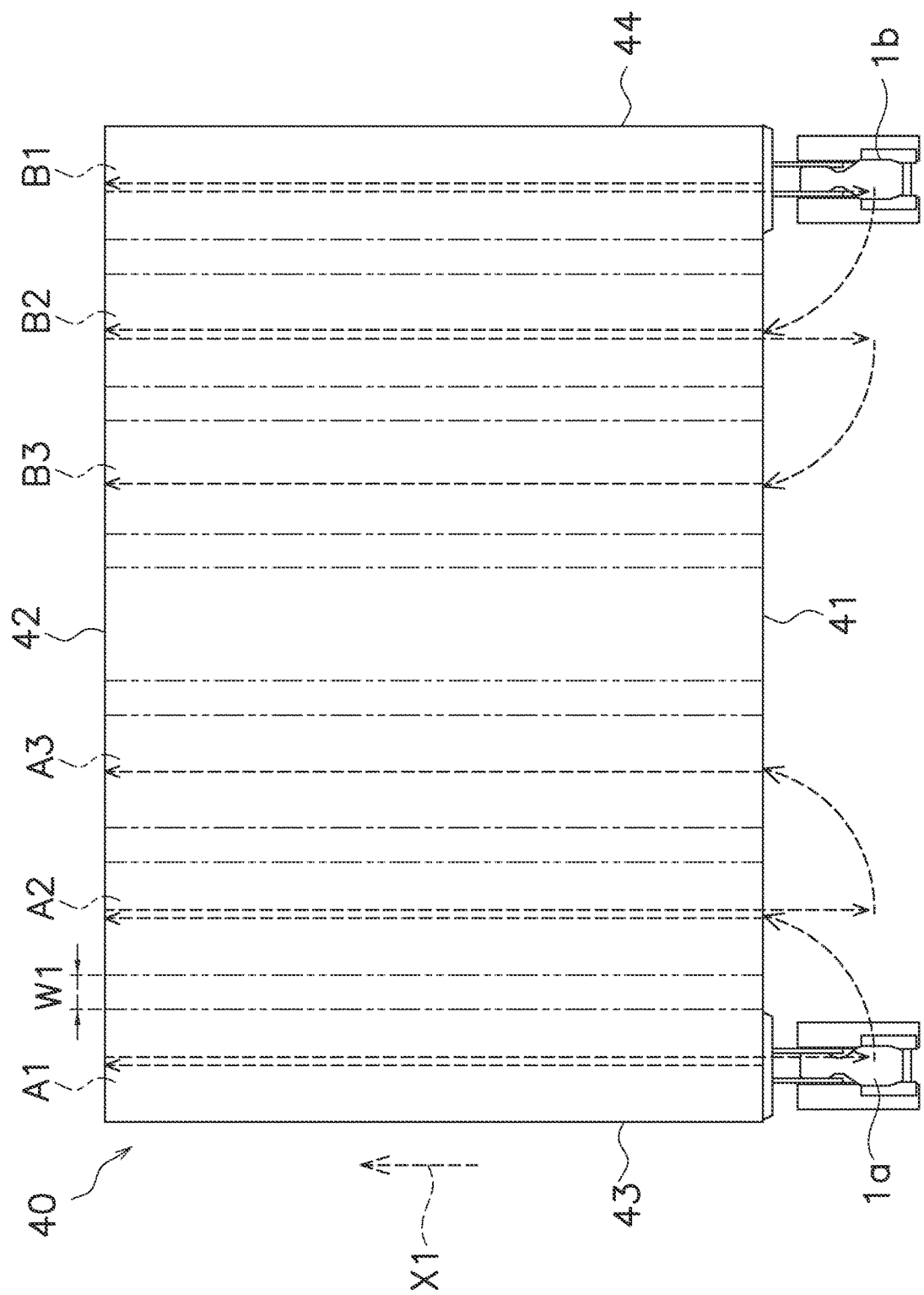
FIG. 6 is a top view of a work site illustrating an example of a work area and a work path.

In step S102, the remote controller 2 acquires area data. The area data indicates a position of a work area 40. FIG. 6 is a top view of the work site illustrating an example of the work area 40. The area data includes a starting end 41 and a terminating end 42 of the work area 40. The work machines 1a and 1b perform digging while moving from the starting end 41 toward the terminating end 42. In the following description, a direction from the starting end 41 toward the terminating end 42 is referred to as a work direction X1. The area data includes a first end 43 and a second end 44 of the work area 40. The second end 44 is positioned opposite the first end 43 in a lateral direction. The lateral direction is a direction intersecting the work direction X1. The remote controller 2 may determine the work area 40 according to an operation of the input device 3 by the operator. Alternatively, the remote controller 2 may automatically determine a plurality of work areas 40 based on the number and performance of the work machines, and determine one of them as the work area 40.

In step S103, the remote controller 2 allocates the work machines to the work area 40. The remote controller 2 allocates a pair of two work machines to one work area 40. The remote controller 2 may determine the two work machines to be allocated to the work area 40 according to an operation of the input device 3 by the operator. Alternatively, the remote controller 2 may automatically determine the two work machines to be allocated to the work area 40. The remote controller 2 may determine such that the respective pair of the work machines are allocated to each of the plurality of work areas 40. In the following description, the remote controller 2 allocates the first work machine 1a and the second work machine 1b to one work area 40.

In step S104, the remote controller 2 acquires work data. The work data includes the width of a slot and the width of a digging wall. The width of the slot and the width of the digging wall are determined according to the width of the blade 18. The width of the slot is approximately the same as the width of the blade 18. The width of the digging wall is less than the width of the blade 18. The remote controller 2 acquires the work data from the storage device 2b. Alternatively, the remote controller 2 may acquire the work data according to an operation of the input device 3 by the operator.

In step S105, the remote controller 2 determines a first work path A1 to be dug by the first work machine 1a. As illustrated in FIG. 6, the first work path A1 extends in the work direction X1 in the work area 40. The first work path A1 extends from the starting end 41 to the terminating end 42. The remote controller 2 determines the first work path A1 from the first end 43. Moreover, the remote controller 2 determines a second work path B1 to be dug by the second work machine 1b. The second work path B1 extends in the work direction X1 in the work area 40. The second work path B1 extends from the starting end 41 to the terminating end 42. The second work path B1 is disposed at an interval from the first work path A1 in the lateral direction. The remote controller 2 determines the second work path B1 from the second end 44.

The remote controller 2 determines a next first work path A2 and a next second work path B2 so that the interval between the first work path and the second work path is decreased. The remote controller 2 determines the next first work path A2 from the first end 43 toward the second end 44. The remote controller 2 determines a position of the next first work path A2 so as to be apart from the previous first work path A1 by a width W1 of the digging wall in the lateral direction. The remote controller 2 determines the next second work path B2 from the second end 44 toward the first end 43. The remote controller 2 determines a position of the next second work path B2 so as to be apart from the previous second work path B1 by the width W1 of the digging wall in the lateral direction.

Figure 7:
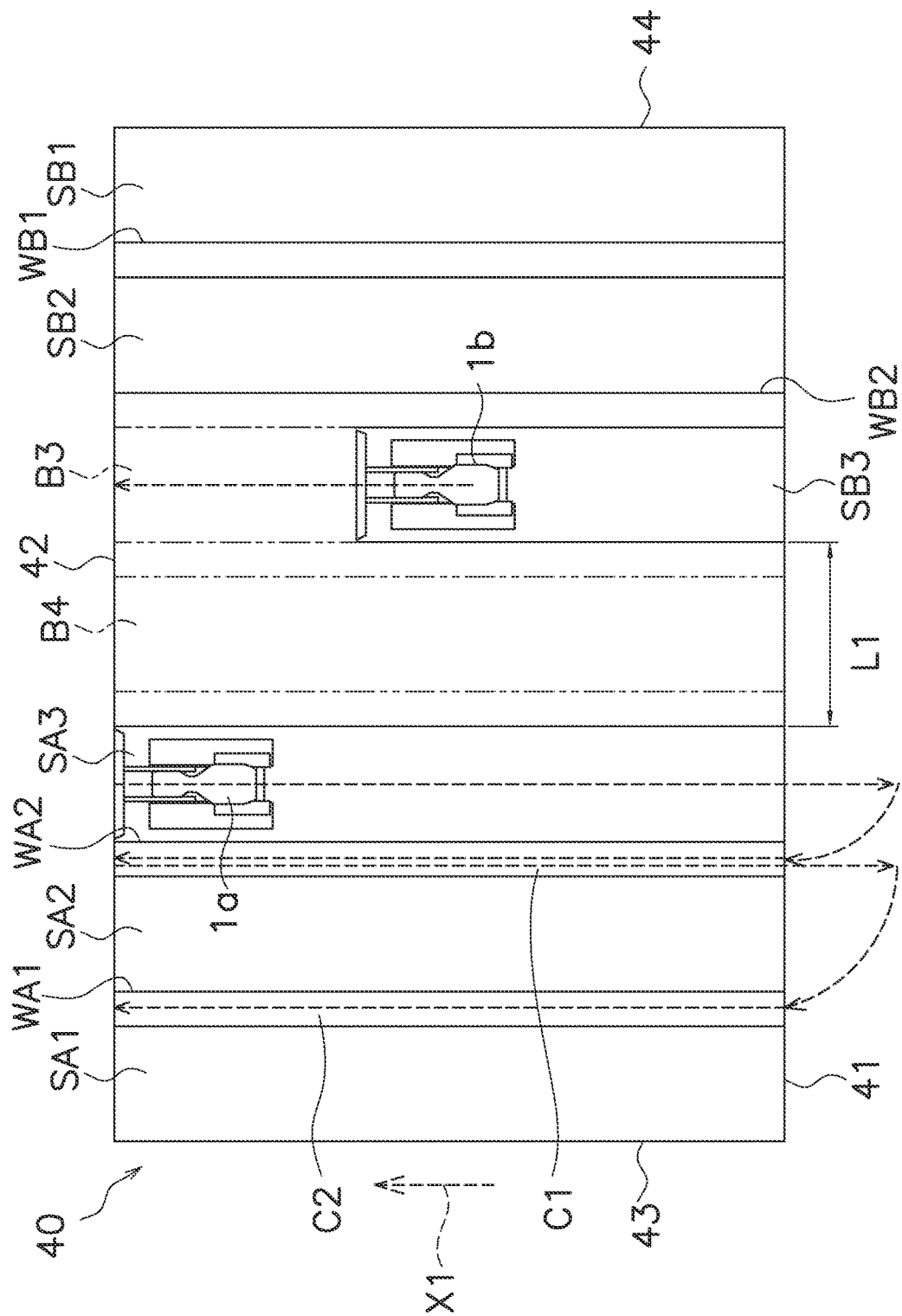
FIG. 7 is a top view of the work site illustrating digging work by a first work machine and a second work machine.

In step S106, the remote controller 2 executes digging work by the first work machine 1a and the second work machine 1b. The remote controller 2 transmits a command signal for digging to the machine controller 26a of the first work machine 1a and the machine controller 26b of the second work machine 1b. The machine controller 26a of the first work machine 1a controls the first work machine 1a according to the command signal. The machine controller 26b of the second work machine 1b controls the second work machine 1b according to the command signal. Thus, the first work machine 1a digs the actual topography 80 from the starting end 41 to the terminating end 42 while moving along the first work path A1. For example, as illustrated in FIG. 5, the first work machine 1a operates the blade 18 according to a target design topography 82 positioned below the actual topography 80 while traveling forward along the first work path A1. Accordingly, the actual topography 80 is dug and a slot SA1 along the first work path A1 is formed as illustrated in FIG. 7. The second work machine 1b digs the actual topography 80 from the starting end 41 to the terminating end 42 while moving along the second work path B1. Accordingly, the actual topography 80 is dug and a slot SB1 along the second work path B1 is formed. In the first process for the work area 40, the remote controller 2 starts digging by the first work machine 1a from the first end 43 along the first work path A1. The remote controller 2 also starts digging by the second work machine 1b from the second end 44 along the second work path B1.

Upon completion of the digging on the previous first work path A1, the first work machine 1a travels in reverse to move to the starting end 41 of the next first work path A2. Then, the first work machine 1a performs digging while traveling forward along the next first work path A2. Thus, a slot SA2 along the first work path A2 is formed. Furthermore, a digging wall WA1 is formed between the slot SA1 and the slot SA2. Upon completion of the digging on the previous second work path B1, the second work machine 1b travels in reverse to move to the starting end 41 of the next second work path B2. Then, the second work machine 1b performs digging while traveling forward along the next second work path B2. Thus, a slot SB2 along the second work path B2 is formed. Furthermore, a digging wall WB1 is formed between the slot SB1 and the slot SB2.

In step S107, the remote controller 2 acquires an interval L1 between the first work paths A1 to A3 and the second work paths B1 to B3. The interval L1 means the distance between the first work paths A1 to A3 and the second work paths B1 to B3 in the lateral direction. The remote controller 2 acquires the interval L1 between the first work path currently being dug among the first work paths A1 to A3 and the second work path currently being dug among the second work paths B1 to B3. In step S108, the remote controller 2 determines whether the interval L1 is less than or equal to a threshold Th1. The predetermined interval L1 may be determined, for example, from the sum of the width of one slot and the widths of the two digging walls. Alternatively, the predetermined interval L1 may be determined from the sum of the widths of the two slots and the widths of the three digging walls. When the interval L1 is greater than the threshold Th1, the remote controller 2 further determines a next first work path A3 and a next second work path B3 so that the interval L1 is decreased, and performs digging along the first work path A3 and the second work path B3. Accordingly, slots SA3 and SB3 and digging walls WA2 and WB2 are formed. The remote controller 2 repeatedly determines the first work path and the second work path until the interval L1 becomes less than or equal to the threshold Th1.

When the interval L1 becomes less than or equal to the threshold Th1, the process proceeds to step S109. In step S109, the remote controller 2 withdraws the first work machine 1a. That is, the remote controller 2 causes the first work machine 1a to move away from the second work machine 1b. As illustrated in FIG. 7, the remote controller 2 determines a third work path C1. The third work path C1 extends in the work direction X1 in the work area 40 as well as the first work path A1. The third work path C1 extends from the starting end 41 to the terminating end 42. The third work path C1 is provided so that the digging wall WA2 is dug by the first work machine 1a. The remote controller 2 determines the third work paths C1, C2 in order toward the first end 43. The first work machine 1a digs the digging wall WA2 and the digging wall WA1 in order while moving along the third work paths C1 and C2, respectively.

The remote controller 2 may withdraw the second work machine 1b. The remote controller 2 may determine which one of the first work machine 1a or the second work machine 1b is to be withdrawn. Alternatively, it may be determined which one of the first work machine 1a or the second work machine 1b is to be withdrawn according to an operation of the input device 3 by the operator.

In step S110, the remote controller 2 determines whether the digging of the last work path has been completed. The remote controller 2 determines whether the second work machine 1b has completed the digging of a last second work path B4. Upon completion of the digging of the last second work path B4, the process proceeds to step S111.

Figure 8:
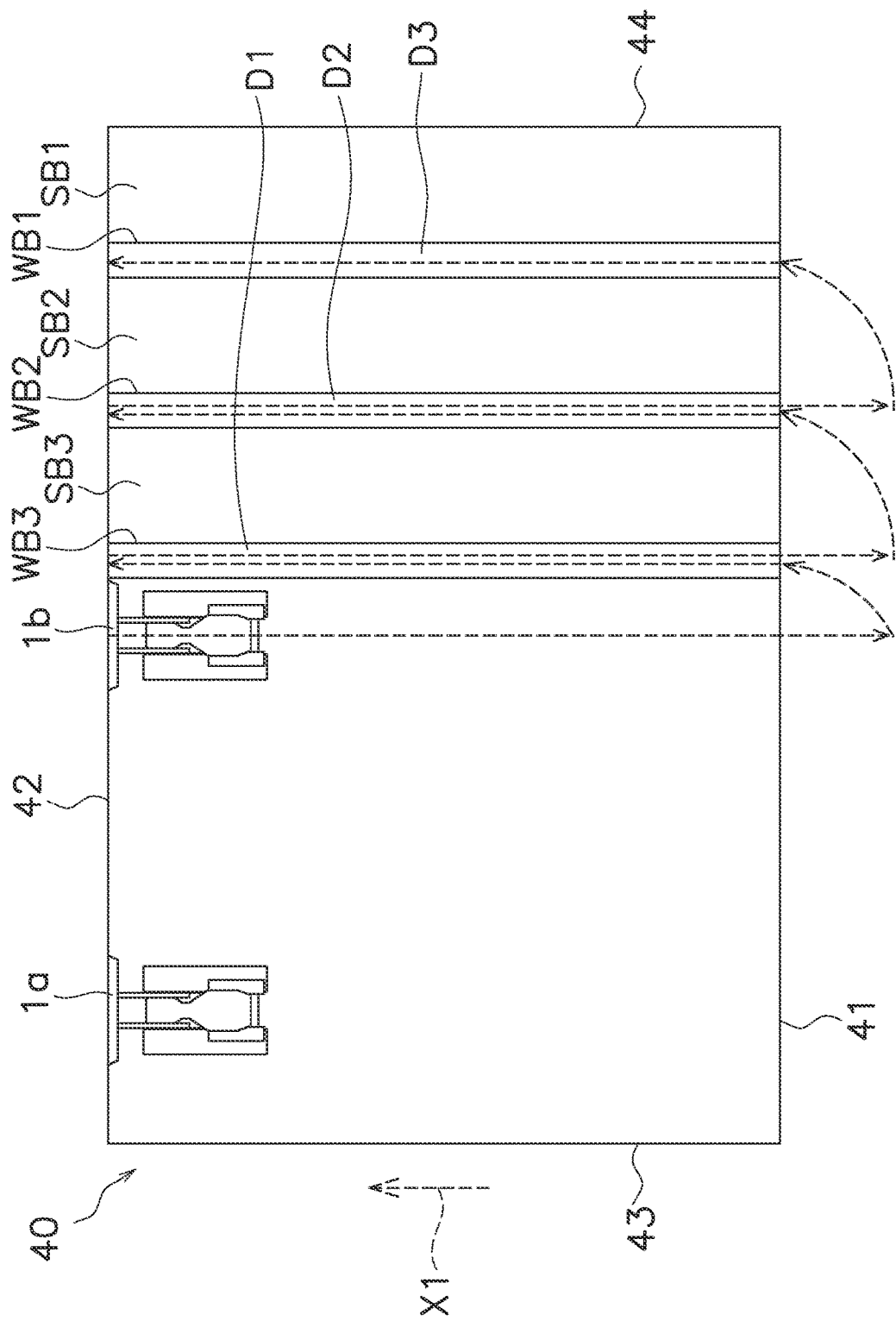
FIG. 8 is a top view of the work site illustrating digging work by the first work machine and the second work machine.

In step S111, the remote controller 2 withdraws the second work machine 1b. That is, the remote controller 2 causes the second work machine 1b to move away from the first work machine 1a in the lateral direction. As illustrated in FIG. 8, the remote controller 2 determines fourth work paths D1, D2, and D3. The fourth work paths D1, D2, and D3 extend in the work direction X1 in the work area 40 as well as the second work path B1. The fourth work paths D1, D2, and D3 extend from the starting end 41 to the terminating end 42. The fourth work paths D1, D2, and D3 are provided so that the digging walls WB1, WB2, and WB3 are dug by the second work machine 1b. The remote controller 2 determines the fourth work paths D1, D2, and D3 in order toward the second end 44. The second work machine 1b digs the digging walls WB3, WB2, and WB1 while moving along the fourth work paths D1, D2, and D3, respectively.

By repeating the above work in the work area 40, the first work machine 1a and the second work machine 1b dig the actual topography 80 in the work area 40 so that the actual topography 80 has a shape along the target design topography 82. As illustrated in FIG. 5, upon completion of the digging of the target design topography 82, the first work machine 1a and the second work machine 1b dig a next target design topography 83 positioned below the target design topography 82. The first work machine 1a and the second work machine 1b repeat the above work until they reach the final target topography 81 or its vicinity.

In the control system 100 of the work machine according to the present embodiment described above, the first work path A1 to be dug by the first work machine 1a is determined, and the second work path B1 to be dug by the second work machine 1b is determined at the interval L1 from the first work path A1. Then, the next first work path A2 and the next second work path B2 are determined so that the interval L1 is decreased. Therefore, the digging of the first work paths A1 to A3 by the first work machine 1a and the digging of the second work paths B1 to B3 by the second work machine 1b are repeated, thereby gradually decreasing a range that has not been dug and is positioned between the first work machine 1a and the second work machine 1b in the work area 40. This reduces the travel distance of the first work machine 1a and the second work machine 1b for digging the work area 40. As a result, efficient digging with a plurality of work machines is achieved.

Although one embodiment has been described so far, the present invention is not limited to the above embodiment and various modifications may be made without departing from the gist of the invention. The work machines 1a and 1b are not limited to bulldozers and may be other vehicles such as wheel loaders or motor graders. The work machines 1a and 1b may be vehicles driven by an electric motor.

The remote controller 2 may have a plurality of controllers separate from one another. The processes by the remote controller 2 may be distributed and executed among the plurality of controllers. The machine controllers 26a and 26b may have a plurality of controllers separate from one another. The processes by the machine controllers 26a and 26b may be distributed and executed among the plurality of controllers. The above-mentioned processes may be distributed and executed among a plurality of processors.

The processes of the automatic control are not limited to those of the above-mentioned embodiment and may be changed, omitted, or added. The execution order of the processes of the automatic control is not limited to that of the above-mentioned embodiment and may be changed. A portion of the processes by the machine controllers 26a and 26b may be executed by the remote controller 2. A portion of the processes by the remote controller 2 may be executed by the machine controller. For example, the processes of determining the paths on which the work machines 1a and 1b move may be executed by the machine controllers of the work machines 1a and 1b, respectively.

The automatic control of the work machines 1a and 1b may be fully automatic or semi-automatic. For example, the work implements of the work machines 1a and 1b are automatically controlled according to the target design topography 82 and the travel of the work machines 1a and 1b during the automatic control such as forward, reverse or rotating may be manually controlled according to the operation of the operating device 5. The manual mode may be omitted. That is, the work machines 1a and 1b may be fully automatically controlled without manual operations by an operator. In this case, the operating device 5 may be omitted.

In the above embodiment, the remote controller 2 withdraws the first work machine 1a when the interval L1 between the work paths is less than or equal to the predetermined threshold Th1. However, the controller may determine whether the distance between the first work machine 1a and the second work machine 1b in the lateral direction is less than or equal to the threshold Th1. When determining that the distance between the first work machine 1a and the second work machine 1b in the lateral direction is less than or equal to the threshold Th1, the remote controller 2 may withdraw the first work machine 1a.

The remote controller 2 may determine all the work paths A1 to A3 and B1 to B4 in the work area 40 before start of the digging. The remote controller 2 may determine the work paths A1 to A3 and B1 to B4 in the work area 40 in order during the digging.

According to the present invention, efficient digging by a plurality of work machines can be achieved.

The invention claimed is:

1. A system for controlling a plurality of work machines including a first work machine and a second work machine, the system comprising:
   a wireless communication device; and
   a controller configured to
      acquire area data indicative of a position of a work area,
      determine a first work path to be dug by the first work machine, the first work path extending in a work direction in the work area,
      determine a second work path to be dug by the second work machine, the second work path extending in the work direction in the work area and disposed at an interval from the first work path in a lateral direction intersecting the work direction,
      control the first work machine to execute work along the first work path and control the second work machine to execute work along the second work path,
      determine whether the interval is less than or equal to a predetermined threshold, or determine whether a distance between the first work machine and the second work machine in the lateral direction is less than or equal to the predetermined threshold,
      upon determining that the interval or the distance is not less than or equal to the predetermined threshold, determine a next first work path and a next second work path so that the interval is decreased, and
      upon determining that the interval or the distance is less than or equal to the predetermined threshold, control the first work machine to move away from the second work machine by determining the next first work path such that the interval is increased.

2. The system according to claim 1, wherein
the area data includes a position of a first end of the work area in the lateral direction, and
the controller is further configured to determine the first work path from the first end in the work area.

3. The system according to claim 2, wherein
the area data includes a position of a second end positioned opposite the first end in the lateral direction in the work area, and
the controller is further configured to determine the second work path from the second end in the work area.

4. The system according to claim 1, wherein
the first work machine includes a blade, and
the controller is further configured to
   determine the first work path so that a digging wall is formed between the first work path and the next first work path, and
   control the first work machine to move away from the second work machine such that the first work machine digs the digging wall upon determining that the interval is less than or equal to the predetermined threshold.

5. The system according to claim 1, wherein
the first work machine includes a blade, and
the controller is further configured to
   determine the first work path so that a digging wall is formed between the first work path and the next first work path, and
   control the first work machine to move away from the second work machine such that the first work machine digs the digging wall upon determining that the distance is less than or equal to the predetermined threshold.

6. A method for controlling a plurality of work machines including a first work machine and a second work machine, the method comprising:
   acquiring area data indicative of a position of a work area;
   determining a first work path to be dug by the first work machine, the first work path extending in a work direction in the work area;
   determining a second work path to be dug by the second work machine, the second work path extending in the work direction in the work area and disposed at an interval from the first work path in a lateral direction intersecting the work direction;

controlling the first work machine to execute work along the first work path and control the second work machine to execute work along the second work path;

determining whether the interval is less than or equal to a predetermined threshold, or determining whether a distance between the first work machine and the second work machine in the lateral direction is less than or equal to the predetermined threshold;

upon determining that the interval or the distance is not less than or equal to the predetermined threshold, determining a next first work path and a next second work path so that the interval is decreased; and upon determining that the interval or the distance is less than or equal to the predetermined threshold, controlling the first work machine to move away from the second work machine by determining the next first work path such that the interval is increased.

7. The method according to claim 6, wherein
the area data includes a position of a first end of the work area in the lateral direction, and
the first work path is determined from the first end in the work area.

8. The method according to claim 7, wherein
the area data includes a position of a second end positioned opposite the first end in the lateral direction in the work area, and
the second work path is determined from the second end in the work area.

9. The method according to claim 6, wherein
the first work machine includes a blade,
the first work path is determined so that a digging wall is formed between the first work path and the next first work path, and
the controlling the first work machine to move away from the second work machine includes controlling the first work machine to dig the digging wall.

10. The method according to claim 6, wherein
the first work machine includes a blade,
the first work path is determined so that a digging wall is formed between the first work path and the next first work path, and
the controlling the first work machine to move away from the second work machine includes controlling the first work machine to dig the digging wall.

* * * * *